United States Patent Office 3,436,379
Patented Apr. 1, 1969

3,436,379
PROCESS FOR THE PRODUCTION
OF COPOLYMERS
James Keith Hambling, Windsor, and Ieuan Jenkin Thomas, Sunbury-on-Thames, Middlesex, England, assignors to The British Petroleum Company Limited, London, England, a company of England
No Drawing. Filed Aug. 5, 1964, Ser. No. 387,783
Claims priority, application Great Britain, Oct. 18, 1963, 41,212/63
Int. Cl. C08f 1/72, 15/40
U.S. Cl. 260—80.7                                    5 Claims This invention relates to copolymers and to a process for the production of copolymers.

We have discovered that copolymerising a mono-olefinically unsaturated hydrocarbon, having a slower polymerisation rate than isobutene, and one or more conjugated dienes in the presence of a Friedel-Crafts catalyst and a minor proportion of isobutene results in an increase in the rate of copolymerisation of the compounds over the rate of copolymerisation when isobutene is not present, using the same amount of catalyst, or alternatively, permits the maintenance of the same rate of polymerisation when isobutene is not present, using less catalyst.

We have also discovered that the resulting copolymer has substantially the characteristics of a copolymer of the mono-olefinically unsaturated hydrocarbon and the conjugated diene or dienes prepared under similar conditions.

Thus according to one aspect of the present invention there is provided a process for the production of a copolymer which process comprises contacting a mono-olefinically unsaturated hydrocarbon having a slower polymerisation rate than isobutene and one or more conjugated dienes, the mono-olefinically unsaturated hydrocarbon being hereinafter referred to as olefin A, with a Friedel-Crafts catalyst in the presence of a minor proportion of isobutene.

Preferably the feedstock contains 70-96.9 mol percent of monomer A, 0.1-20 mol percent of total conjugated diene and 3-10 mol percent of isobutene.

Greater proportions of isobutene may be employed if so desired, but, in general, no further advantages will accrue from their use. As the proportion of isobutene rises, so the risk of producing a copolymer of different physical properties from the copolymer of olefin A and the conjugated diene or dienes increases. Lesser proportions may also be employed, but as the proportions falls, so the risk of the proportion being too small to be effective rises.

Preferably olefin A is a methylpentene-1. Most preferably olefin A is 4-methylpentene-1.

Preferably the conjugated diene or dienes contains or contain between 4 and 10 carbon atoms per molecule. Very suitable conjugated dienes include butadiene, isoprene, 4 - methyl - 1,3 - pentadiene and 2 - methyl - 1,3-pentadiene.

Suitable Friedel-Crafts catalyst include aluminium chloride, aluminium bromide, boron trifluoride and hydrogen fluoride.

The preferred catalyst is aluminium chloride.

Preferably the weight ratio of the catalyst to the total weight of monomers with which it is in contact initially is in the range 0.25-10% by weight of the total weight of monomers, most preferably in the range 0.5-5% by weight.

Preferably the catalyst is in solution form when contacted with the feedstock. Suitable solvents for the catalyst include halogenated hydrocarbons, for example, ethyl chloride.

Preferably copolymerisation is effected in the presence of an inert diluent. Suitable diluents include hydrocarbons and halogenated hydrocarbons, for example n-heptane and ethyl chloride. Most preferably the diluent is also a solvent for the catalyst.

Preferably the weight ratio of the diluent to the weight of monomer with which it is in contact initially is in the range 1:1 to 10:1, most preferably in the range 3:1 to 8:1.

Preferably copolymerisation is carried out at a temperature in the range 0° to —120° C. For the production of rubbery copolymers the most preferred temperature range is between —80° C. and —120° C.

The pressure may be sub-atmospheric, atmospheric or super-atmospheric.

Preferably the macro-molecules of the copolymer consist of 70 to 96.9% of units derived from olefin A, from 0.1 to 20% of units derived from the conjugated diene or dienes and from 3 to 10% of units derived from isobutene.

The invention is illustrated by but not limited with reference to the following examples. It is to be understood that Example 1 is provided for comparative purposes only and operation in accordance with Example 1 is not operation in accordance with the present invention.

Example 1.—Copolymerisation of 4-methylpentene-1 and isoprene with $AlCl_3$

A mixture of 4-methylpentene-1 (120 ml.: 0.96 mole), isoprene (4 ml.; 0.04 mole) and ethyl chloride solvent (900 ml.) was cooled to —90° C. in a glass reactor under an atmosphere of dry nitrogen.

To the vigorously stirred mixture was added 200 ml. of a ½ percent solution of $AlCl_3$ in ethyl chloride. The reaction mixture developed a cloudy orange-yellow colour over a period of 2 hours. At the end of this time the reaction was terminated by the addition of methanol (100 ml.). The ethyl chloride was evaporated off and the polymer, dissolved in 1 litre of n-heptane, was washed twice with 500 ml. portions of water, and precipitated in acetone. The polymer was then dried at 50° C. under vacuum (0.2 mm.).

The yield of copolymer was 41 g. (50 percent of theory). The limiting viscosity number of the polymer in decalin at 130° C. was 1.03.

Example 2.—Copolymerisation of 4-methylpentene-1/ isobutene/isoprene

The experiment described with reference to Example 1 was repeated with an olefinic feed having the following composition:

| | Mole percent |
|---|---|
| 4-methylpentene-1 | 0.90 |
| Isobutene | 0.06 |
| Isoprene | 0.04 |

15 minutes after the addition of 200 ml. of a solution of ½ percent $AlCl_3$ in ethyl chloride, the reaction was terminated, and the copolymer worked up as before. The yield of copolymer was 59% of the theoretical amount. The limiting viscosity number of the polymer in decalin at 130° C. was 1.50.

Example 3

The experiment described with reference to Example 2 was repeated with the difference that the catalyst solution concentration was reduced to ¼% and the reaction time was extended to 2 hours. The yield of copolymer was 60% of the theoretical amount. The limiting viscosity number of the polymer in decalin at 130° C. was 1.51.

We claim:
1. A process for the production of a copolymer which process comprises: contacting from 70 to 96.9 mol per- cent of 4-methylpentene-1 and from 0.1–20 mol percent of a member selected from the group consisting of isoprene and butadiene, with from 3–10 mol percent of isobutene at a temperature in the range 0°—−120° C. in the presence of 0.25–10% by weight of a Friedel-Crafts catalyst, expressed as a percentage by weight of the total weight of monomers.

2. A process according to claim 1, wherein polymerisation is carried out at a temperature in the range −80°– −120° C.

3. A process according to claim 1, wherein the catalyst is aluminium chloride.

4. A process according to claim 1, wherein polymerisation is effected in the presence of an inert diluent.

5. A process according to claim 4, wherein the diluent is ethyl chloride.

References Cited
UNITED STATES PATENTS
3,299,022  1/1967  Edwards _____ 260—88.2

JAMES A. SEIDLECK, *Primary Examiner.*

U.S. Cl. X.R.

260—85.3